United States Patent
Hitomi et al.

(10) Patent No.: US 10,277,878 B2
(45) Date of Patent: *Apr. 30, 2019

(54) SYSTEMS, METHODS, AND MEDIA FOR RECONSTRUCTING A SPACE-TIME VOLUME FROM A CODED IMAGE

(71) Applicant: Sony Corporation, Tokyo (JP)

(72) Inventors: Yasunobu Hitomi, Kanagawa (JP); Jinwei Gu, Rochester, NY (US); Mohit Gupta, New York, NY (US); Tomoo Mitsunaga, Kanagawa (JP); Shree K. Nayar, New York, NY (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,297

(22) Filed: Apr. 11, 2018

(65) Prior Publication Data

US 2018/0234672 A1 Aug. 16, 2018

Related U.S. Application Data

(63) Continuation of application No. 15/405,962, filed on Jan. 13, 2017, now Pat. No. 9,979,945, which is a (Continued)

(51) Int. Cl.
*H04N 5/235* (2006.01)
*H04N 13/106* (2018.01)
(Continued)

(52) U.S. Cl.
CPC ......... *H04N 13/106* (2018.05); *G06T 1/0007* (2013.01); *G06T 5/002* (2013.01);
(Continued)

(58) Field of Classification Search
CPC .. H04N 13/106; H04N 13/388; H04N 13/296; H04N 5/2353; H04N 13/128
See application file for complete search history.

(56) References Cited

U.S. PATENT DOCUMENTS 7,428,019 B2 9/2008 Irani et al.
7,511,643 B2 3/2009 Baraniuk et al.
(Continued)

OTHER PUBLICATIONS

Gil Bub, Matthias Tecza, Michiel Helmes, Peter Lee & Peter Kohl, Temporal pixel multiplexing for simultaneous high-speed, high-resolution imaging, Published online Feb. 14, 2010, Nature Methods, vol. 7, No. 3., pp. 209-213.
(Continued)

*Primary Examiner* — Padma Haliyur
(74) *Attorney, Agent, or Firm* — Wolf, Greenfield & Sacks, P.C.

(57) ABSTRACT

Systems, methods, and media for reconstructing a space-time volume from a coded image are provided. In accordance with some embodiments, systems for reconstructing a space-time volume from a coded image are provided, the systems comprising: an image sensor that outputs image data; and at least one processor that: causes a projection of the space-time volume to be captured in a single image of the image data in accordance with a coded shutter function; receives the image data; and performs a reconstruction process on the image data to provide a space-time volume corresponding to the image data.

11 Claims, 4 Drawing Sheets

Related U.S. Application Data continuation of application No. 14/001,139, filed as application No. PCT/US2012/026816 on Feb. 27, 2012, now abandoned.

(60) Provisional application No. 61/446,970, filed on Feb. 25, 2011.

(51) Int. Cl.

| | | |
|---|---|---|
| *G06T 1/00* | (2006.01) | |
| *H04N 5/341* | (2011.01) | |
| *H04N 5/353* | (2011.01) | |
| *G06T 5/00* | (2006.01) | |
| *G06T 7/50* | (2017.01) | |
| *H04N 13/296* | (2018.01) | |
| *H04N 13/388* | (2018.01) | |
| *H04N 13/128* | (2018.01) | |

(52) U.S. Cl.
CPC ............ *G06T 7/50* (2017.01); *H04N 5/2353* (2013.01); *H04N 5/341* (2013.01); *H04N 5/3535* (2013.01); *H04N 13/128* (2018.05); *H04N 13/296* (2018.05); *H04N 13/388* (2018.05); *G06T 2200/21* (2013.01)

(56) References Cited

U.S. PATENT DOCUMENTS

| | | |
|---|---|---|
| 8,797,433 B2 | 8/2014 | Kaizu et al. |
| 8,798,395 B2 | 8/2014 | Jo |
| 8,803,985 B2 | 8/2014 | Kaizu et al. |
| 8,848,063 B2 | 9/2014 | Jo et al. |
| 8,933,924 B2 | 1/2015 | Sato |
| 9,036,060 B2 | 5/2015 | Kaizu et al. |
| 9,060,134 B2 | 6/2015 | Mitsunaga |
| 9,100,514 B2 | 8/2015 | Gu et al. |
| 9,124,809 B2 | 9/2015 | Kaizu et al. |
| 9,344,637 B2 | 5/2016 | Kasai et al. |
| 9,357,137 B2 | 5/2016 | Mitsunaga |
| 9,648,248 B2 | 5/2017 | Gupta et al. |
| 9,736,425 B2 | 8/2017 | Gu et al. |
| 2003/0076423 A1 | 4/2003 | Dolgoff |
| 2003/0108101 A1 | 6/2003 | Frossard et al. |
| 2006/0215934 A1 | 9/2006 | Peleg et al. |
| 2006/0221067 A1 | 10/2006 | Kim et al. |
| 2007/0103595 A1 | 5/2007 | Gong et al. |
| 2007/0104382 A1 | 5/2007 | Jasinschi |
| 2008/0278610 A1 | 11/2008 | Boettiger |
| 2012/0218426 A1 | 8/2012 | Kaizu et al. |
| 2012/0281111 A1 | 11/2012 | Jo et al. |
| 2012/0287294 A1 | 11/2012 | Kaizu et al. |
| 2012/0314124 A1 | 12/2012 | Kaizu et al. |
| 2013/0033616 A1 | 2/2013 | Kaizu et al. |
| 2013/0050177 A1 | 2/2013 | Sato |
| 2013/0050284 A1 | 2/2013 | Sato |
| 2013/0050520 A1 | 2/2013 | Takeuchi |
| 2013/0051700 A1 | 2/2013 | Jo |
| 2013/0070121 A1 | 3/2013 | Gu et al. |
| 2013/0308044 A1 | 11/2013 | Mitsunaga |
| 2013/0329128 A1 | 12/2013 | Kaizu et al. |
| 2014/0192235 A1 | 7/2014 | Hitomi et al. |
| 2014/0192250 A1 | 7/2014 | Mitsunaga |
| 2014/0267828 A1 | 9/2014 | Kasai et al. |
| 2014/0313400 A1 | 10/2014 | Kaizu et al. |
| 2014/0321766 A1 | 10/2014 | Jo |
| 2014/0340550 A1 | 11/2014 | Kaizu et al. |
| 2014/0368697 A1 | 12/2014 | Jo et al. |
| 2015/0312463 A1 | 10/2015 | Gupta et al. |
| 2015/0341576 A1 | 11/2015 | Gu et al. |
| 2016/0248956 A1 | 8/2016 | Mitsunaga |
| 2017/0034412 A1 | 2/2017 | Jo et al. |
| 2017/0134706 A1 | 5/2017 | Hitomi et al. |
| 2017/0230562 A1 | 8/2017 | Gupta et al. |

OTHER PUBLICATIONS

U.S. Appl. No. 13/399,222, filed Feb. 17, 2012, Kaizu et al.
U.S. Appl. No. 13/452,977, filed Apr. 23, 2012, Jo et al.
U.S. Appl. No. 13/457,774, filed Apr. 27, 2012, Kaizu et al.
U.S. Appl. No. 13/487,682, filed Jun. 4, 2012, Kaizu et al.
U.S. Appl. No. 13/504,905, filed Dec. 7, 2012, Gu et al.
U.S. Appl. No. 13/559,720, filed Jul. 27, 2012, Kaizu et al.
U.S. Appl. No. 13/565,202, filed Aug. 2, 2012, Takeuchi.
U.S. Appl. No. 13/983,672, filed Aug. 5, 2013, Mitsunaga.
U.S. Appl. No. 14/000,647, filed Aug. 21, 2013, Kaizu et al.
U.S. Appl. No. 14/001,139, filed Mar. 24, 2014, Hitomi et al.
U.S. Appl. No. 14/131,221, filed Mar. 21, 2014, Kasai et al.
U.S. Appl. No. 14/238,216, filed Feb. 11, 2014, Mitsunaga.
U.S. Appl. No. 14/319,212, filed Jun. 30, 2014, Kaizu et al.
U.S. Appl. No. 14/326,963, filed Jul. 9, 2014, Kaizu et al.
U.S. Appl. No. 14/472,153, filed Aug. 28, 2014, Jo et al.
U.S. Appl. No. 14/652,397, filed Jun. 15, 2015, Gupta et al.
U.S. Appl. No. 14/816,976, filed Aug. 3, 2015, Gu et al.
U.S. Appl. No. 15/143,336, filed Apr. 29, 2016, Mitsunaga.
U.S. Appl. No. 15/302,670, filed Oct. 7, 2016, Jo et al.
U.S. Appl. No. 15/405,962, filed Jan. 13, 2017, Hitomi et al.
U.S. Appl. No. 15/452,420, filed Mar. 7, 2017, Gupta et al.
International Search Report and Written Opinion dated May 23, 2012 in connection with Internaitonal Application No. PCT/US2012/026816.
International Prelimiary Report on Patentability dated Sep. 6, 2013 in connection with Internaitonal Application No. PCT/US2012/026816.

SYSTEMS, METHODS, AND MEDIA FOR RECONSTRUCTING A SPACE-TIME VOLUME FROM A CODED IMAGE

CROSS REFERENCE TO RELATED APPLICATION

This application is a continuation of and claims the benefit under 35 U.S.C. § 120 of U.S. patent application Ser. No. 15/405,962, now U.S. Pat. No. 9,979,945, titled "SYSTEMS, METHODS, AND MEDIA FOR RECONSTRUCTING A SPACE-TIME VOLUME FROM A CODED IMAGE", filed on Jan. 13, 2017, which is a continuation of and claims the benefit under 35 U.S.C. § 120 of U.S. patent application Ser. No. 14/001,139, titled "SYSTEMS, METHODS, AND MEDIA FOR RECONSTRUCTING A SPACE-TIME VOLUME FROM A CODED IMAGE", filed on Mar. 24, 2014, which is a U.S. National Stage Application under 35 U.S.C. § 371, based on International Application No. PCT/US2012/026816, filed on Feb. 27, 2012, which claims the benefit of U.S. Provisional Patent Application No. 61/446,970, filed Feb. 25, 2011. Each of these applications is hereby incorporated by reference herein in its entirety.

TECHNICAL FIELD

Systems, methods, and media for reconstructing a space-time volume from a coded image are provided.

BACKGROUND

Cameras face a fundamental trade-off between spatial resolution and temporal resolution. For example, many digital still cameras can capture images with high spatial resolution, while many high-speed video cameras suffer from low spatial resolution. This limitation is due in many instances to hardware factors such as readout and analog-to-digital (A/D) conversion time of image sensors. Although it is possible to increase the readout throughput by introducing parallel A/D convertors and frame buffers, doing so often requires more transistors per pixel, which lowers the fill factor, and increases the cost, for such image sensors. As a compromise, many current camera manufacturers implement a "thin-out" mode, which directly trades-off the spatial resolution for higher temporal resolution, thereby degrading the image quality.

Accordingly, new mechanisms for providing improved temporal resolution without sacrificing spatial resolution are desirable.

SUMMARY

Systems, methods, and media for reconstructing a space-time volume from a coded image are provided. In accordance with some embodiments, systems for reconstructing a space-time volume from a coded image are provided, the systems comprising: an image sensor that outputs image data; and at least one processor that: causes a projection of the space-time volume to be captured in a single image of the image data in accordance with a coded shutter function; receives the image data; and performs a reconstruction process on the image data to provide a space-time volume corresponding to the image data.

In accordance with some embodiments, methods for reconstructing a space-time volume from a coded image are provided, the methods comprising: causing a projection of the space-time volume to be captured by an image sensor in a single image of image data in accordance with a coded shutter function using a hardware processor; receiving the image data using a hardware processor; and performing a reconstruction process on the image data to provide a space-time volume corresponding to the image data using a hardware processor.

In accordance with some embodiments, non-transitory computer-readable media containing computer-executable instructions that, when executed by a processor, cause the processor to perform a method for reconstructing a space-time volume from a coded image are provided, the method comprising: causing a projection of the space-time volume to be captured in a single image of image data in accordance with a coded shutter function; receiving the image data; and performing a reconstruction process on the image data to provide a space-time volume corresponding to the image data.

DETAILED DESCRIPTION

Systems, methods, and media for reconstructing a space-time volume from a coded image are provided. In some embodiments, these systems, methods, and media can provide improved temporal resolution without sacrificing spatial resolution in a captured video.

In accordance with some embodiments, a video can be produced by reconstructing a space-time volume E from a single coded image I captured using a per-pixel coded shutter function S which defines how pixels of a camera sensor capture the coded image I.

In terms of the space-time volume E and the coded shutter function S, the coded image I can be defined as shown in equation (1):

$$I(x,y) = \sum_{t=1}^{N} S(x,y,t) \cdot E(x,y,t), \qquad (1)$$

where x and y correspond to the two-dimensions corresponding to an M×M pixel neighborhood of a camera sensor, t corresponds to N intervals of one integration time of the camera sensor, and the resolution of this space-time volume E is M×M×N. Although a neighborhood of a camera sensor is described herein as being square (M×M) for simplicity and consistency, in some embodiments, a neighborhood need not be square and can be any suitable shape.

Equation (1) can also be written in matrix form as I=SE, where I (observation) and E (unknowns) are vectors with M×M and M×M×N elements, respectively, and S is a matrix with M×M rows and M×N columns. Because the number of observations (M×M) is significantly lower than the number of unknowns (M×M×N), this is an under-determined system. In some embodiments, this system can be solved and the unknown signal E can be recovered if the signal E is sparse and the sampling satisfies the restricted isometry property:

$$I = SE = SD\alpha, \qquad (2)$$

where D is a basis in which E is sparse, and α is the sparse representation of E.

Figure 1:
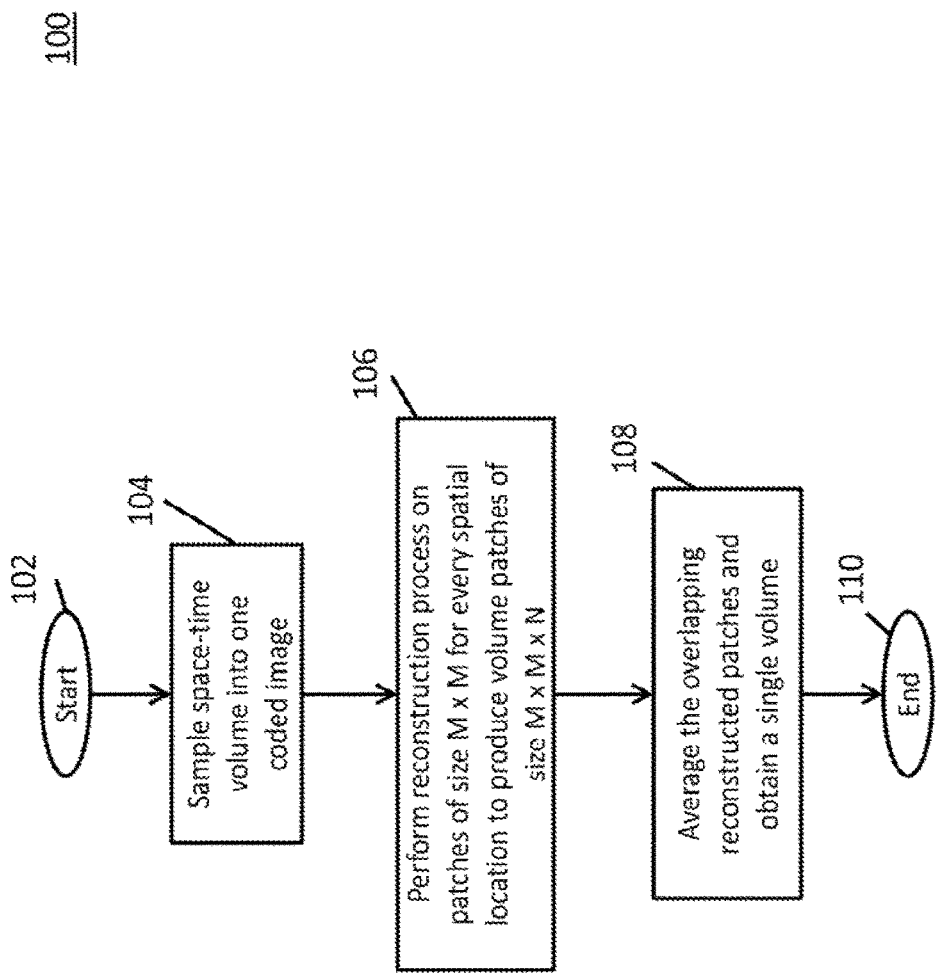
FIG. 1 is a diagram of a process for producing a space-time volume video from a single coded image in accordance with some embodiments.

Turning to FIG. 1, an example of a process 100 for reconstructing a space-time volume from a captured image is shown. As illustrated, after process 100 begins at 102, the space-time volume can be sampled into a coded image using a coded shutter function at 104.

Any suitable coded shutter function can be used to capture an image at 104, and the used shutter function can have any suitable attributes. For example, in some embodiments, the shutter function can have the attribute of being a binary shutter function (i.e., $S(x, y, t) \in 0, 1$) wherein, at every time interval t, the shutter is either integrating light (on) or not (off). As another example, in some embodiments, the shutter function can have the attribute of having only one continuous exposure period (or "bump") for each pixel during a camera sensor's integration time. As yet another example, in some embodiments, the shutter function can have the attribute of having one or more bump lengths (i.e., durations of exposure) measured in intervals t. As still another example, in some embodiments, the shutter function can have the attribute of having bumps that start at periodic or random times. As a further example, in some embodiments, the shutter function can have the attribute of having groups of pixels having the same start time based on location (e.g., in the same row) in a camera sensor. As a still further example, in some embodiments, the shutter function can have the attribute that at least one pixel of each M×M pixel neighborhood of a camera sensor is sampled at each interval during the camera sensor's integration time.

In some embodiments, a coded shutter function can include a combination of such attributes. For example, in some embodiments, a coded shutter function can be a binary shutter function, can have only one continuous exposure period (or "bump") for each pixel during a camera sensor's integration time, can have only one bump length, can have bumps that start at random times, and can have the attribute that at least one pixel of each M×M pixel neighborhood of a camera sensor is sampled at each interval during the camera sensor's integration time.

Figure 2:
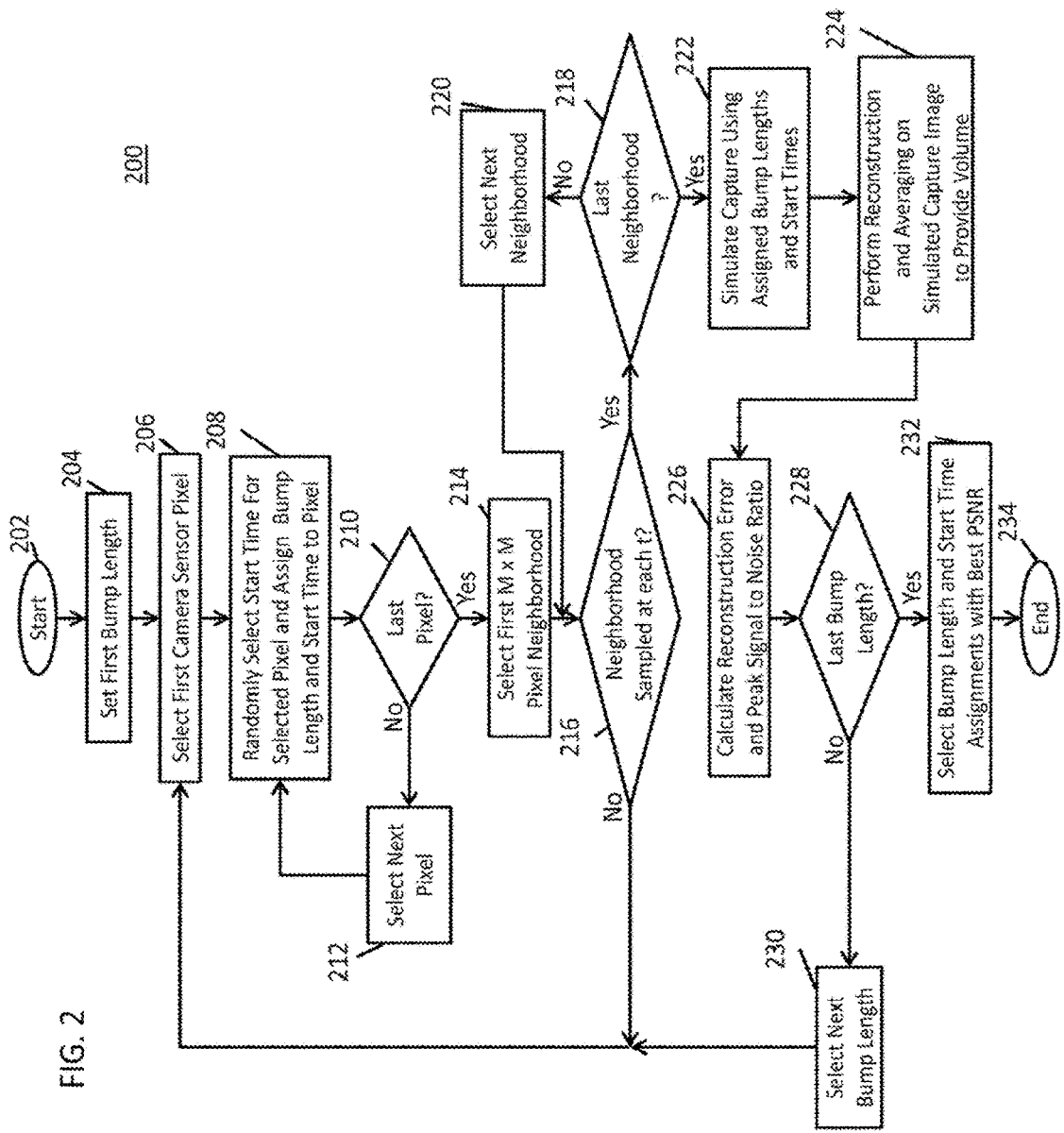
FIG. 2 is a diagram of a process for generating a coded shutter function in accordance with some embodiments.

A process 200 for generating such a coded shutter function in accordance with some embodiments is illustrated in FIG. 2. This process can be performed at any suitable point or points in time and can be performed only once in some embodiments.

As shown, after process 200 begins at 202, the process can set a first bump length at 204. Any suitable bump length can be set as the first bump length. For example, in some embodiments, the first bump length can be set to one interval t.

Next, at 206, the process can select the first camera sensor pixel. Any suitable pixel can be selected as the first camera sensor pixel. For example, the camera sensor pixel with the lowest set of coordinate values can be set as the first camera sensor pixel.

Then, at 208, process 200 can randomly select (or pseudo-randomly select) a start time during the integration time of the camera's sensor for the selected pixel and assign the bump length and start time to the pixel. At 210, it can be determined if the selected pixel is the last pixel. If not, then process 200 can select the next pixel (using any suitable technique) at 212 and loop back to 208.

Otherwise, process 200 can next select a first M×M pixel neighborhood at 214. This neighborhood can be selected in any suitable manner. For example, a first M×M pixel neighborhood can be selected as the M×M pixel neighborhood with the lowest set of coordinates.

At 216, the process can then determine if at least one pixel in the selected neighborhood was sampled at each time t. This determination can be made in any suitable manner. For example, in some embodiments, the process can loop through each time t and determine if a pixel in the neighborhood has a bump that occurs during that time t. If no pixel in the neighborhood is determined to have a bump during the time t, then the neighborhood can be determined as not having at least one pixel being sampled at each time t and process 200 can loop back to 206.

Otherwise, the process can determine if the current neighborhood is the last neighborhood at 218. This determination can be made in any suitable manner. For example, in some embodiments, the current neighborhood can be determined as being the last neighborhood if it has the highest coordinate pair of all of the neighborhoods. If it is determined that the current neighborhood is not the last neighborhood, then process 200 can select the next neighborhood at 220 and loop back to 216.

Otherwise, at 222, process 200 can next simulate image capture using the bump length and start time assigned to each pixel. Image capture can be simulated in any suitable manner. For example, in some embodiments, image capture can be simulated using real high-speed video data. Next, at 224, reconstruction of the M×M×N sub-volumes and averaging of the sub-volumes to provide a single volume can be performed as described in connection with 106 and 108 of FIG. 1 below. Then, at 226, the peak signal to noise ratio (PSNR) for the single volume produced at 222 and 224 can be determined. This PSNR can be determined in any suitable manner, such as by comparing the single volume to real high-speed video used for the simulated image capture.

At 228, process 200 can determine if the current bump length is the last bump length to be checked. This can be determined in any suitable manner. For example, when the bump length is equal to the camera sensor's integration time, the bump length can be determined to be the last bump length. If the bump length is determined to not be the last bump length, then process 200 can select the next bump length at 230 and loop back to 206. The next bump length can be selected in any suitable manner. For example, the next bump length can be set to be the previous bump length plus one interval t in some embodiments.

Otherwise, the bump length and starting time assignments with the best PSNR can be selected as the coded shutter function at 232. The best PSNR can be selected on any suitable basis. For example, in some embodiment, the best PSNR can be selected as the highest PSNR value determined in the presence of noise similar to anticipated camera noise.

Finally, once the bump length and starting time assignments with the best PSNR are selected as the coded shutter function, process 200 can terminate at 234.

Referring back to FIG. 1, after sampling the space-time volume into one coded image at 104, a reconstruction process can be performed on patches of size M×M for every spatial location in the captured image to produce volume patches of size M×M×N at 106. This reconstruction process can be performed in any suitable manner. For example, in some embodiments, this reconstruction process can be performed by solving the following sparse approximation problem to find $\hat{\alpha}$:

$$\hat{\alpha} = \arg_\alpha \min \|\alpha\|_0 \text{ subject to } \|SD\alpha - I\|_2^2 < \varepsilon \qquad (3)$$

where:
α is a sparse representation of E;
S is a matrix of the shutter function;
D is an over-complete dictionary;

I is a vector of the captured coded image; and

ε is the error between the reconstructed space-time volume and the ground truth. Any suitable mechanism can be used to solve this approximation problem. For example, in accordance with some embodiments, the orthogonal matching pursuit (OMP) algorithm can be used to solve this approximation problem.

Once $\hat{\alpha}$ has been found, the space-time volume can be computed by solving $\hat{E}=D\hat{\alpha}$.

Any suitable over-complete dictionary D can be used in some embodiments, and such a dictionary can be formed in any suitable manner. For example, in accordance with some embodiments, an over-complete dictionary for sparsely expressing target video volumes can be built from a large collection of natural video data. Such an over-complete dictionary can be trained from patches of natural scenes in a training data set using the K-SVD algorithm, as described in Aharon et al., "K-SVD: An Algorithm for Designing Overcomplete Dictionaries for Sparse Representation," IEEE Transactions on Signal Processing, vol. 54, no. 11, November 2006, which is hereby incorporated by reference herein in its entirety. Such training can occur any suitable number of times (such as only once) and can occur at any suitable point(s) in time.

Any suitable number of videos of any suitable type can be used to train the dictionary in some embodiments. For example, in some embodiments, a random selection of 20 video sequences with frame rates close to a target frame rate (e.g., 300 fps) can be used in some embodiments. To add variability to the data set, spatial rotations on the sequences can be performed and the sequences can be used for training in their forward (i.e., normal playback) and backward (i.e., reverse playback) directions, in some embodiments. Any suitable rotations can be performed in some embodiments. For example, in some embodiments, rotations of 0, 45, 90, 135, 180, 215, 270, and 315 degrees can be performed. Any suitable number of basis elements (e.g., 5000) can be extracted from each sequence in some embodiments. As a result, the learned dictionary can capture various features such as shifting edges in various orientations in some embodiments.

After the reconstruction process has been performed for the all positions, the overlapping reconstructed patches can be averaged and the full space-time volume obtained at 108, and process 100 can terminate at 110.

The resulting space-time volume video can then be used in any suitable manner. For example, this video can be presented on a display, can be stored, can be analyzed, etc.

Figure 3:
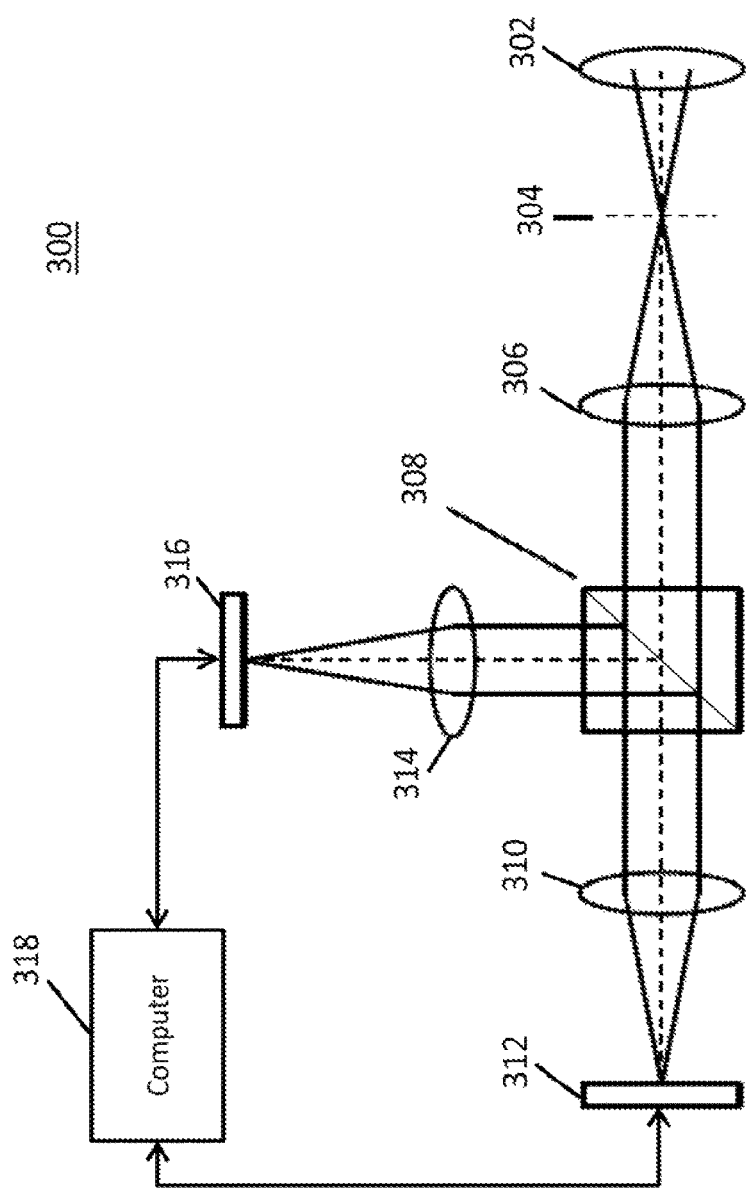
FIG. 3 is a diagram of hardware that can be used in accordance with some embodiments.

Turning to FIG. 3, an example of hardware 300 that can be used in some embodiments. As shown, the hardware can include an objective lens 302, relay lenses 306, 310, and 314, a polarizing beam splitter 308, a Liquid Crystal on Silicon (LCoS) chip 312, an image sensor 316, and a computer 318.

The scene can be imaged onto a virtual image plane 304 using objective lens 302. Objective lens 302 can be any suitable lens, such as an objective lens with a focal length equal to 25 mm, for example. The virtual image can then be re-focused onto an image plane of LCoS chip 312 via relay lenses 306 and 310 and polarizing beam splitter 308. LCoS chip 312 can be any suitable LCoS chip, such as a LCoS chip part number SXGA-3DM from Forth Dimension Displays Ltd. of Birmingham, UK. Relay lenses 306 and 310 can be any suitable lenses, such as relay lenses with focal lengths equal to 100 mm, for example. Polarizing beam splitter 308 can be any suitable polarizing beam splitter.

The image formed on the image plane of LCoS chip 312 can be polarized according to the shutter function and reflected back to polarizing beam splitter 308, which can reflect the image through relay lens 314 and can focus the image on image sensor 316. Relay lens 314 can be any suitable relay lens, such as a relay lens with a focal length equal to 100 mm, for example. Image sensor 316 can be any suitable image sensor, such as a Point Grey Grasshopper sensor from Point Grey Research Inc. of Richmond, BC, Canada.

As stated above, the virtual image can be focused on both the image plane of the LCoS chip and the image sensor, thereby enabling per-pixel alignment between the pixels of the LCoS chip and the pixels of the image sensor. A trigger signal from the LCoS chip into computer 318 can be used to temporally synchronize the LCoS chip and the image sensor. The LCoS chip can be run at any suitable frequency. For example, in some embodiments, the LCoS chip can be run at 9-18 times the frame-rate of the image sensor.

Figure 4:
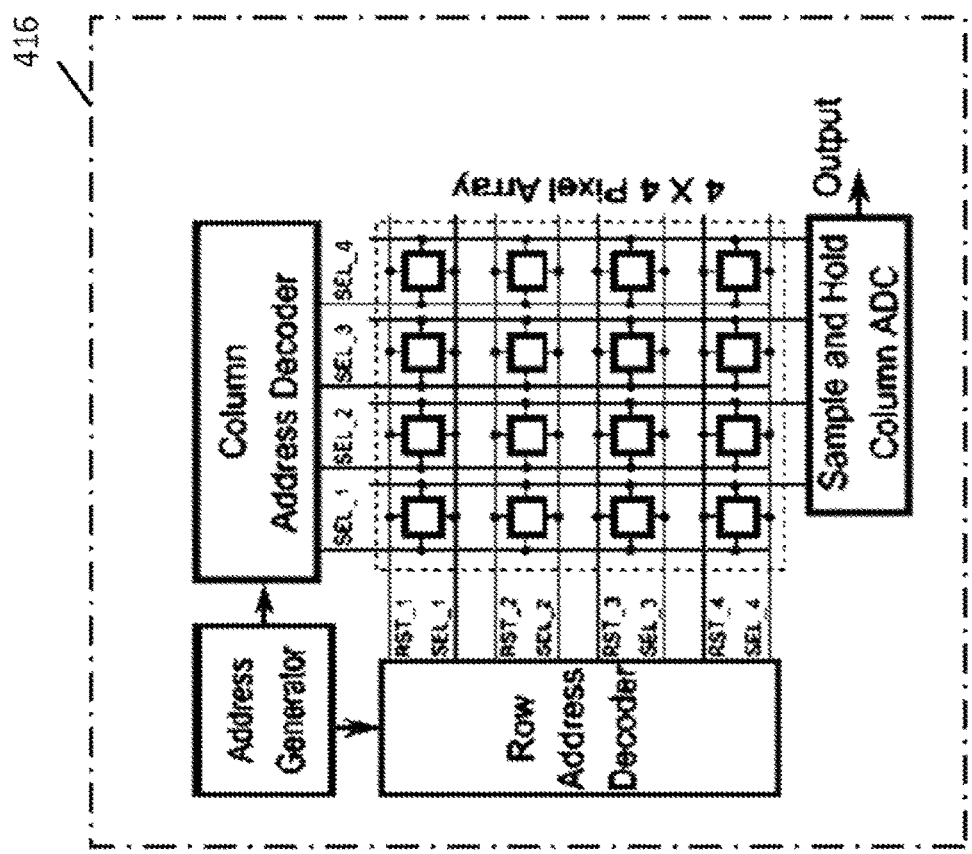
FIG. 4 is a diagram of an image sensor that can be used in accordance with some embodiments.

Alternatively to using a LCoS chip to perform a shutter function, the shutter function can be performed by pixel-wise control of reset and reading of the pixels in an image sensor 416 as shown in FIG. 4 in some embodiments. As illustrated, image sensor 416 can allow pixel-wise access by providing both row and column select lines for the pixel array. Image sensor 416 can be a CMOS image sensor in some embodiments. In such an embodiment including an image sensor 416, the LCoS chip, the beam splitter, and some of the lenses can be omitted.

Computer 318 can be used to perform functions described above and any additional or alternative function(s). For example, computer 318 can be used to perform the functions described above in connection with FIGS. 1 and 2. Computer 318 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. In some embodiments, computer 318 can be part of another device (such as a camera, a mobile phone, computing device, a gaming device, etc.) or can be a stand-alone device.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors; optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. An image processing apparatus, comprising:
   an image sensor configured to include a plurality of pixels; and
   at least one processor configured to:
   instruct the image sensor to capture multiple exposure periods for different pixels of the plurality of pixels in accordance with a coded shutter function to produce a single coded image,
   generate a space-time volume from the single coded image, and
   perform, for each pixel location in the single coded image, a reconstruction process on a patch of pixels forming a neighborhood around the pixel location to produce a set of spatially-overlapping space-time volume patches.

2. The image processing apparatus of claim 1, wherein generating the space-time volume comprises performing sparse approximation.

3. The image processing apparatus of claim 2, wherein generating the space-time volume comprises using an overcomplete dictionary.

4. The image processing apparatus of claim 1, wherein the coded shutter function has random start times for pixel exposure bumps.

5. The image processing apparatus of claim 1, wherein the coded shutter function has only a single exposure period per pixel per sensor integration time.

6. The image processing apparatus of claim 1, wherein the coded shutter function has at least one pixel in each neighborhood exposed during each interval of a sensor integration time.

7. The image processing apparatus of claim 1, further comprising a Liquid Crystal on Silicon chip that modulates light onto the image sensor according to the coded shutter function in response to signals from the at least one processor.

8. The image processing apparatus of claim 1, wherein the image sensor has pixels that are individually addressable.

9. The image processing apparatus of claim 2, wherein performing sparse approximation comprises using an orthogonal matching pursuit algorithm.

10. The image processing apparatus of claim 1, wherein the at least one processor is further configured to average the spatially-overlapping space-time-volume patches in the set to reconstruct the space-time volume for the single coded image.

11. The image processing apparatus of claim 1, wherein each space-time volume patch in the set corresponds to a different pixel location in the single encoded image.

* * * * *